March 6, 1951  W. P. C. SMITH  2,543,876
HYDRAULIC POWER UNIT WITH FIXED PISTON
FOR PRODUCING OSCILLATING MOTION
Filed April 23, 1949
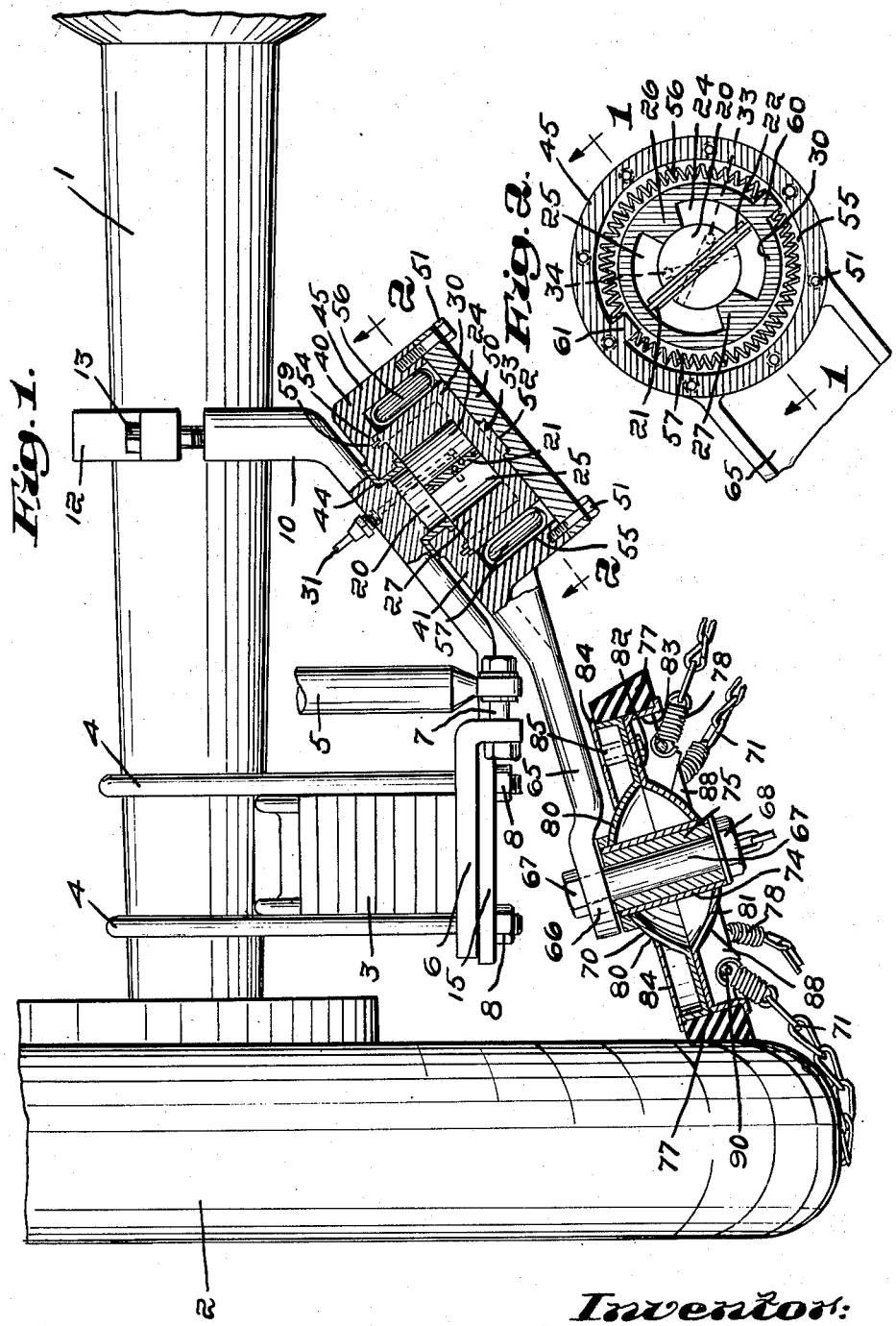
Inventor:
William P. C. Smith
by James R. Hodder
Attorney Patented Mar. 6, 1951

2,543,876

UNITED STATES PATENT OFFICE 2,543,876

HYDRAULIC POWER UNIT WITH FIXED PISTON FOR PRODUCING OSCILLATING MOTION

William P. C. Smith, Rockport, Mass.

Application April 23, 1949, Serial No. 89,207

2 Claims. (Cl. 121—38)

My present invention is a novel and improved hydraulic power unit wherein power actuations are produced by partial, semi-rotary, or oscillating motion of a casing surrounding a fixed piston-like blade.

In my companion and copending application, Ser. No. 89,206, filed April 23, 1949, I have shown, described, and claimed a hydraulic power-actuating mechanism wherein a fixed casing encloses a movable blade-like piston; and in my present application I have elected to illustrate and claim an alternate construction wherein a fixed piston-like blade is employed and the surrounding casing is moved relatively to the blade.

In my said copending application, also, I have shown a power connection thru a yielding type of so-called Bendix spring; and in my present application I have illustrated a novel type of yielding connection between the fixed piston or blade and the movable rotary, partial-rotary, or oscillating enclosing casing.

I have also illustrated in the present casing a power connection whereby a rotor carrying traction chains for use in an automobile is thrown into and out of operative position, of the general type illustrated in patents to H. N. Ridgway Nos. 2,241,923 and 2,283,948, although the invention is not limited to such application.

In carrying out my present invention, I secure to a suitable support, bracket, or the like, by a rigid connection, a piston-like blade and construct and arrange to be oscillated around said blade the enclosing casing, which casing constitutes a liquid-receiving chamber. Thus I provide means whereby a rigidly supported piston-like blade adapted to receive power actuations entering the chamber on alternate and opposite sides of the piston act to oscillate the enclosing case about said fixed piston and thereby to transmit power thru the oscillations of the outer and enclosing casing itself.

Preferably, also, I have devised novel yielding means to effect such transmission of power from the oscillating casing to a rotatable connection to outside mechanism to be actuated.

Referring to the drawings:

Fig. 1 is a diagrammatic view illustrating my present power unit as fixed to a brace or bracket on an automobile and adapted to move a rotor carrying traction chains into and out of contact with a wheel or tire of an automobile, the power unit and rotor being shown partly in cross-section; and Fig. 2 is a cross-sectional view on the line 2—2 of Fig. 1.

Referring to the drawings illustrating a preferred embodiment of the present invention, 1 illustrates the housing of an automobile axle, 2 the tire adjacent one end, 3 a supporting spring attached to the housing 1 by U-bolts 4—4; 5 indicating the usual shock absorber secured to a plate 6 by bolt 7 and also held to the U-bolts 4—4 by threaded nuts 8—8 fitted on the bottom, as is customary.

Secured to the housing 1 and the U-bolts 4—4 is shown a bracket 10 having a clamp 12 extending over the top of the housing 1 and held by bolts 13, with the other end of the bracket in the form of a plate 15, having openings thru which U-bolts 4—4 may pass and which end plate 15 is also secured to the spring U-bolts by the headed nuts 8—8. Thus the bracket 10 is rigidly secured in position and constitutes a support for my power unit to be assembled thereon.

In order to amplify construction and assembly, I may form the rigid piston or blade-carrying element as a part of the brace 10, the same being herein shown for purposes of illustration as a hub 20 extending from the brace 10 in proper angular position relatively with the housing 1 and wheel 2 to insure the oscillating movement of the surrounding casing to swing the rotor carrying the traction chains into and out of operative position, as will be explained.

To the hub 20 is rigidly secured the piston-like blade 21 which preferably carries a synthetic plastic bearing member 22 which may be of neoprene or the like and which is of suitable proportions to cooperate with and bear upon the walls of chambers 24 and 25 formed between abutments 26 and 27 in the enclosing casing 30.

In this particular construction, I have illustrated the piston-like blade element as extending with the opposite ends into two cooperating chambers; whereas in my said companion application wherein the casing is fixed and the piston-like blade moves I have only shown same operating in a single chamber, but either the single or double chamber construction can be utilized in each alternate form, if desired.

Hydraulic fluid from a pump or other suitable source of power is led thru pipes indicated at 31 into openings shown in dotted lines at 33 and 34, which lead into opposite sides of the piston 21 when the surrounding casing 30 is at the extreme limits of the oscillation permitted by the abutments 26 and 27. Thus, the alternate application of fluid pressure about the fixed pistons will oscillate the enclosing casing 30.

Surrounding the casing 30 and also acting as a rotary bearing therefor is a second enclosing member 40 in the form of a hollow receptacle with end walls 41 having an opening therethru for the hub 20 and with provision for a bearing member 44 to be fitted between the hub 20 and the member 40, the side walls 45 of said member 40 being in circular form and extending substantially level with the enclosing end of the casing 30, said member being adapted to receive a cover 50 secured to the outer element 40 by bolts 51—51.

Said cover has a central recess 52 in which the projecting end 53 constituting a stud-like bearing is formed on the casing 30 and with corresponding grooves and projections, as indicated at 54 on the opposite edge of the casing 30, which latter may be also provided with a synthetic plastic, as neoprene, or the like sealing rib 59. Thus the member 40 constitutes a bearing for the casing 30 and also encloses the same and holds it in assembled position, as shown in Fig. 1.

The circular walls 45 of the member 40 are spaced sufficiently from the exterior of the casing 30 to provide recesses therebetween, as indicated at 55 to receive in said recesses coiled springs 56 and 57, which springs, respectively, bear against diametrically opposite abutments 60 formed on the exterior of the casing 30, and 61 on the interior of the member 40 extending from the side walls 45. These abutments 60 and 61, respectively, extend partially across the spaces 56 and 57 but free of contact. Thus, rotary action of the casing 30 as it is oscillated about the fixed blade 21 will similarly move and oscillate the member 40 thru the actuation of the springs 56 and 57 on the abutments 60 and 61, respectively, thereby giving a yielding transmission of power to the outer element 40.

As herein shown, I have illustrated an extending rod 65 formed integral with or welded to the outer element 40, which rod carries on its outer end the rotor designated generally at 50, to which the traction chains 71—71 are suitably secured.

For this purpose, I form the outer end of the rod 65 with an enlarged end 66 thru which a headed bolt 67 passes and on which the rotor 70 is mounted. As herein illustrated, the rotor 70 is formed with a central tubular member 74 fitting on a tubular bearing 75 encircling the shank of the bolt 67 and held in position by a nut 68. The rotor carries in its outer end a rubber or the like contact member 77 for engagement with the side walls of the tire 2. Several springs 71 are attached to the rotor by coiled springs 78—78 to permit a yielding action if and when the ends of the traction members 71 are under the tire 2 while the vehicle is still moving to the contact of the rotor with the walls of the tire rotating the rotor and throw out the chains by centrifugal force, as explained in the patents to H. Ridgway.

In this particular installation, as shown for illustrative purposes in the drawing, my power unit is employed to throw the rotor 70 into operative position with the contact member 77 in driving engagement with the tire 2, when the casing 30 and member 40 are moved into appropriate position therefor by hydraulic actuation against the fixed blade 20.

On reversing the power actuation, the arms 65 and the attached rotor are moved upwardly in contact with or against the housing 1, lifting the rotor and attached chains out of engagement with the tire and holding the same in inoperative position.

It will be noted that the bracket 10 is positioned and arranged at an angle relatively with the axle housing 1 and tire 2 at substantially 45°, this being important to facilitate the movement of the arm 65 and rotor 70 into correct tire-engaging operative position, and thence to be swung into inoperative position, holding the rotor and depending chain 71 at a substantial height to give road clearance.

While I may utilize any desired type of rotor and traction chains or members, I have herein illustrated a novel construction of rotor formed with a pair of plates 80 and 81 of circular conformation and of concavo-convex contour where welded to the tubular member 74. These plates are then joined in a rib-like conformation as indicated at 82; whereupon their outer ends are flanged, as shown at 83, to receive and hold the yielding contact member 77. A circular disc 84 is secured to the rib portion 82 of the rotor by bolts 85 and, preferably, has its rim extending beyond the diameter of the flange 83 in order to afford an enclosing rim on one side for the member 77, as clearly shown in Fig. 1.

This disc 84 also is in close contact with the adjacent part of the arm 65 and thus will tend to keep the links 71 from being thrown or jammed into engagement between the rotor and arm 65. The spring 78 and attached links may be secured in any desired manner, but as herein shown, I provide a series of braces 88 between the flange 83 and connection portion 80 of the rotor, which braces are welded or otherwise secured in the underneath part of the rotor and to which braces the springs are attached on rods or pins 90.

It will thus be appreciated that my present hydraulic power unit with a fixed blade or piston about which a rotatable element is oscillated by the alternate admission of fluid power on opposite sides of the fixed blade enables an extremely strong, simple, efficient, and compact construction to be effectively mounted and efficiently operated in any desired position or connection.

The relative movement imparted to the surrounding movable element can be directly connected to mechanism to be moved either directly and rigidly or with the interposition of the yielding spring, or springs, in association with an outer surrounding shell or casing, as shown in the drawings for illustrative purposes.

The power unit can be of any capacity and size for the special work desired and the speed of operation required. I may also desire to make the piston of two plates with an intermediate layer of synthetic plastic which projects sufficiently beyond the marginal edges of the piston blades or plates to constitute a wear-resisting bearing element, as illustrated and claimed in my companion application Ser. No. 89,206, filed April 23, 1949.

It will be appreciated that my hydraulic power unit with the fixed piston thus acts automatically to hold the rod 65 either in downward operative position at the limit of movement determined by the travel of the pistons, or to hold the same in upward inoperative position and, preferably, in contact with the casing 1 and yet permit yielding of the rod 65 and attached devices should the same strike an obstruction and temporarily retract the rod 65 either against the tension of the springs 56 and 57 or against the hydraulic pipe line leading to the same, as further explained in my companion copending application Ser. No. 89,206, filed April 23, 1949.

Such yielding construction thus protects the apparatus from injury and automatically returns the same to normal and desired position and is particularly important when the rotor is in lowered position and in operative contact with the tire 2.

In this construction, also, I may form the piston blade 22 as a double plate with the neoprene bearing element 21 therebetween as an alternative construction, shown in the drawings with the blade as a single element and grooved to receive a strip of neoprene or other bearing. This alternative arrangement facilitates assembly and lightness.

I claim:

1. A hydraulic power unit of the kind described, comprising an inner fixed piston-like blade, a rotatable surrounding member having a recess therein adapted to fit closely about the fixed blade, means to admit hydraulic pressure into said chamber on opposite sides of said blade to oscillate the surrounding member thereabout, and an enclosing element surrounding the rotatable member and adapted to be yieldingly moved thereby during oscillations of said rotatable member, the said surrounding element being adapted to be connected to mechanism to be actuated.

2. A power unit as set forth in claim 1, wherein the outer enclosing element and the surrounding element are relatively independently rotatable and spaced apart, an abutment in said space extending to the surrounding element, and a separate abutment extending into said space from the surrounding element, coiled springs within said space bearing between said respective abutments.

WILLIAM P. C. SMITH.

REFERENCES CITED

The following references are of record in the file of this patent:

UNITED STATES PATENTS

| Number | Name | Date |
|---|---|---|
| 720,442 | Keyser | Feb. 10, 1903 |
| 919,767 | Raymer | Apr. 27, 1909 |
| 2,339,042 | Anderson | Jan. 11, 1944 |
| 2,400,418 | Hofbauer | May 14, 1946 |
| 2,407,144 | Edwards | Sept. 3, 1946 |
| 2,489,326 | Rockstrom et al. | Nov. 29, 1949 |